(12) United States Patent
Dennis et al.

(10) Patent No.: US 8,970,935 B2
(45) Date of Patent: Mar. 3, 2015

(54) HIGH ENERGY FIBER LASER MODULATOR

(71) Applicant: The Johns Hopkins University, Baltimore, MD (US)

(72) Inventors: Michael L. Dennis, Ellicott City, MD (US); William E. Torruellas, Ellicott City, MD (US); David M. Brown, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 401 days.

(21) Appl. No.: 13/628,454

(22) Filed: Sep. 27, 2012

(65) Prior Publication Data

US 2014/0086267 A1 Mar. 27, 2014

(51) Int. Cl.
*G02F 1/03* (2006.01)
*G02F 1/01* (2006.01)
*H01S 3/30* (2006.01)
*H04J 14/00* (2006.01)

(52) U.S. Cl.
USPC ................ 359/246; 359/279; 372/6; 398/43

(58) Field of Classification Search
USPC ......... 359/246, 315, 215, 247, 251–252, 254, 359/108, 237–238, 278–279, 290–292, 298, 359/300–302
See application file for complete search history.

(56) References Cited

U.S. PATENT DOCUMENTS

| 7,286,574 | B2 | 10/2007 | Brasseur et al. |
| 7,936,796 | B2 | 5/2011 | Durkin et al. |
| 7,941,019 | B1 | 5/2011 | Brooks et al. |
| 2005/0036525 | A1 | 2/2005 | Liu |
| 2011/0194166 | A1 | 8/2011 | Varnham et al. |
| 2012/0020616 | A1* | 1/2012 | Babie et al. ................. 385/27 |

FOREIGN PATENT DOCUMENTS

| EP | 1696520 | 8/2006 |
| WO | 2009100113 | 8/2009 |
| WO | 2011053816 | 5/2011 |
| WO | 2011109753 | 9/2011 |

\* cited by examiner

*Primary Examiner* — Dawayne A Pinkney
(74) *Attorney, Agent, or Firm* — Noah J. Hayward

(57) ABSTRACT

A laser device includes a seed laser, a polarizer, a pseudorandom bit sequence (PRBS) pattern generator, and a phase modulator. The polarizer may be optically coupled to receive an output of the seed laser and may generate a polarization filtered output. The PRBS pattern generator may be configured to generate a PRBS pattern. The phase modulator may be configured to apply a PRBS modulation scheme to the polarization filtered output based on the PRBS pattern. The PRBS pattern may be generated to have a length above a first threshold for avoiding an occurrence of backward propagation being in phase with forward propagation in an active fiber receiving an output of the phase modulator when the pattern repeats and below a second threshold for phase mismatch in the active fiber.

18 Claims, 4 Drawing Sheets

HIGH ENERGY FIBER LASER MODULATOR

TECHNICAL FIELD

Example embodiments generally relate to laser devices and, more particularly, relate to high energy fiber lasers.

BACKGROUND

Providing a high energy fiber laser with a narrow linewidth can be a difficult task. Stimulated Brillouin scattering (SBS) is a phenomenon that can be particularly troublesome in relation to achieving such a laser. SBS occurs when light in a medium encounters optical density variations that may alter its energy and path. The optical density variations may be time dependent variations that are caused by acoustic modes, magnetic modes, or temperature gradients. SBS that occurs, for example within high power amplification stages, may create attenuation, power saturation and/or backward propagation of light in a fiber amplifier.

Some techniques have been employed to attempt to reduce SBS for high energy laser applications. For example, techniques including varying the refractive index as a function of fiber radius or modulating the phase of the pump light with an RF noise source of several GHz have both been employed to reduce the optical overlap with the SBS gain spectrum. Other techniques include coiling the fiber or stressing the fiber in some way. However, some of these techniques may not be desirable or optimal in some cases.

BRIEF SUMMARY OF SOME EXAMPLES

Accordingly, some example embodiments may enable the provision of high energy fiber laser that employs a different modulation scheme that may improve laser performance and/or decrease the frequency or severity of the occurrence of SBS.

In one example embodiment, a laser device is provided. The laser device may include a seed laser, a polarizer, a pseudorandom bit sequence (PRBS) pattern generator, and a phase modulator. The polarizer may be optically coupled to receive an output of the seed laser and may generate a polarization filtered output. The PRBS pattern generator may be configured to generate a PRBS pattern. The phase modulator may be configured to apply a PRBS modulation scheme to the polarization filtered output based on the PRBS pattern. The PRBS pattern may be generated to have a length above a first threshold for avoiding an occurrence of backward propagation being in phase with forward propagation in an active fiber receiving an output of the phase modulator when the pattern repeats and below a second threshold for phase mismatch in the active fiber.

According to another example embodiment, a phase modulator for a laser device is provided. The phase modulator may include an input device and a modulator. The input device may be in operable communication with a polarizer to receive a polarization filtered output of the polarizer responsive to the polarizer polarizing an output of a seed laser. The modulator may be configured to modulate the polarization filtered output of the polarizer based on a pseudorandom bit sequence (PRBS) pattern provided by a PRBS generator in communication with the phase modulator. The PRBS pattern may be generated to have a length above a first threshold for avoiding an occurrence of backward propagation being in phase with forward propagation in an active fiber receiving an output of the phase modulator when the pattern repeats and below a second threshold for phase mismatch in the active fiber.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Figure 1:
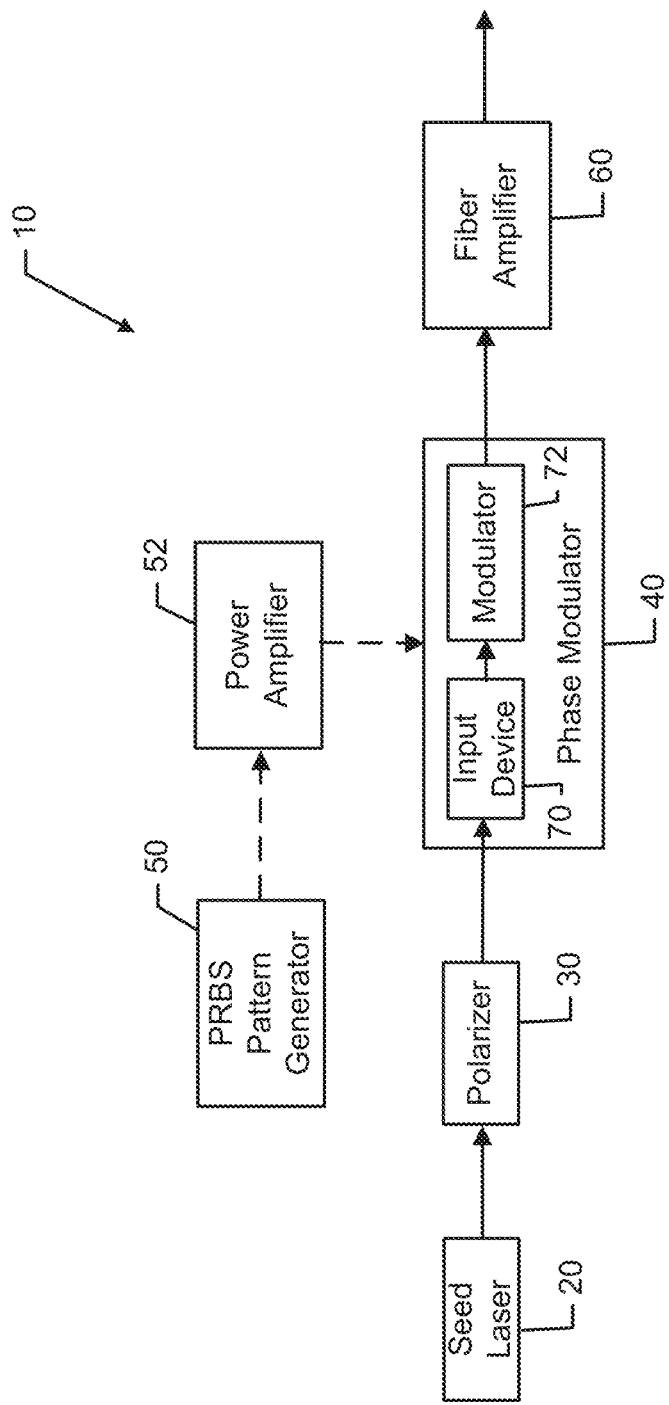
FIG. 1 is a block diagram of a system of components comprising a laser device according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may improve the ability of designers to provide a high energy fiber laser that is less susceptible to performance degradation by SBS. In this regard, for example, some embodiments may employ an optimized Pseudo Random Bit Sequence (PRBS) modulation scheme in combination with employment of a polarization filter of light prior to modulation. The optimization of the PRBS modulation scheme may be aimed at providing a maximum output power for a corresponding minimized bandwidth. Accordingly, for example, a modulation scheme that is narrow enough to provide for easy combination may be employed, while the modulation scheme is at the same time of a sufficiently large bandwidth to enable better overall output power. In some embodiments, a length of PRBS pattern employed for the modulation scheme may be selected to be below a threshold length or short enough to avoid excessive in-phase light along the length of the amplifier. Some embodiments, instead of modulating the light directly out of a single frequency seed source for a high power fiber amplifier, may first clean the polarization of the output of a laser diode (e.g., seed laser) using an all fiber polarizer. An output of the polarizer may then be provided or spliced directly to a phase modulator that modulates the light with the PRBS. By essentially, "polarization filtering" the input to the phase modulator, all of the light entering the phase modulator may be properly modulated to assist in readying the output of the laser to be combined with other laser outputs. Without the fiber polarizer employed prior to modulation, an amount of DC or unmodulated light may not be avoidable, and the optical bandwidth of this unmodulated light may closely match the SBS gain bandwidth, which may make the system quickly reach an SBS threshold or amplifier output power limit.

Typical high power fiber lasers may either use GHz-class RF noise sources to drive a phase modulator, or use a broadband laser diode to ensure the power contained in the SBS gain bandwidth is minimized. Some example embodiments may employ PRBS modulation, and may in some cases further optimize employment of PRBS modulation, to achieve higher powers than are achievable by employment of RF noise sources. In an example embodiment, a by-product of the employment of a PRBS modulation scheme may be that beam encoding is supported. Such beam encoding may be useful for current and future high energy fiber laser systems used for applications that require beam combination. Thus, some example embodiments may improve laser performance and/or decrease the frequency or severity of the occurrence of SBS.

FIG. 1 is a block diagram of a system of components comprising a laser device 10 according to an example embodiment. In FIG. 1, solid connection lines represent operable coupling in the form of an optical connection (e.g., optical fiber), and dashed lines represent electrical connection (e.g., via electrical transmission cables of any suitable type). The laser device 10 of this example embodiment includes a seed laser 20 that is optically coupled to a polarizer 30. An output of the polarizer 30 may thereafter provide polarized light to a phase modulator 40. The phase modulator 40 may be configured to modulate the polarized light received from the polarizer 30 based on a PRBS modulation scheme. In this regard, for example, a PRBS pattern generator 50 may be employed to generate the PRBS pattern used to modulate the polarized light using an optimized modulation pattern. In this example, an output of the PRBS pattern generator 50 may be amplified using a power amplifier 52, prior to feeding the PRBS pattern to the phase modulator 40. An output of the phase modulator 40, which may be a modulated output based on the polarization filtered input provided from the polarizer 30, may be provided to a fiber amplifier 60.

The PRBS pattern generator 50 may be, for example, a 0.5 to 10 Gbits PRBS pattern generator. However, other pattern generators may be employed in other example embodiments. In some embodiments, the PRBS pattern generator 50 may also include a white noise source (e.g., a 10 GHz RF white-noise source) that may directly or indirectly (e.g., via a high pass, low pass or band pass filter) provide noise to be summed with the PRBS pattern generated by the PRBS pattern generator 50. However, other embodiments may not employ any white noise source at all. Regardless of whether any noise component is employed, the PRBS pattern generator 50 may include one or more amplifiers and/or filters to provide adequate modulation bandwidth and modulation depth when driving the phase modulator 40. The PRBS pattern generated may have a mean value of 0.5 and, in some cases, may have a maximum length of repeating a "0" or "1" that is governed by the sequence length (e.g., a bit pattern of $2^7$ would be a relatively short pattern with a string of seven zeros or ones, while a bit pattern of $2^{31}$ would be a longer string including thirty-one zeros or ones).

In an example embodiment, the seed laser 20 may be a 1064 nm, 30 MHz linewidth seed diode. However, numerous other seed lasers may be employed in other embodiments. Thus, for example, the seed laser 20 may include a plurality of diodes powered by a computer controlled power supply. One or more splice trays may also be employed to splice a plurality of fiber optic cables to generate an output of the seed laser 20. The seed laser 20 may therefore be a single frequency seed source to provide an input to the polarizer 30. In an example embodiment, the polarizer 30 may be embodied as a linear fiber polarizer.

In some embodiments, the fiber amplifier 60 may be a 1 kW fiber amplifier. However, other amplifiers may be employed in alternative embodiments. For a 1 kW fiber amplifier, practical application has demonstrated optimal, or at least nearly optimal performance has been demonstrated for a bit pattern of $2^7$. In other words, a string of seven zeros or ones in a pseudo randomly generated order may provide good performance for the laser device 10 at a 1 kW power output. Performance characteristics may be influenced by the fact that a bit pattern of $2^7$ may provide an optimal mismatch between forward and backward propagating waves inside the active fiber. Accordingly, an optimal condition may be achieved with a pattern that is short enough to maximize the phase mismatch along the active fiber, but is not so short that when the pattern repeats, backward propagation is again in phase with forward propagation. For longer patterns (e.g., bit pattern of $2^{31}$, which would include a string of 31 zeros or ones), extensive buildup of SBS may occur for an instance of time (or once per repetition of pattern). For other amplifier sizes, corresponding adjustments to the optimal bit pattern length may be experienced. However, example embodiments using a bit pattern of $2^7$ and a 1 kW fiber amplifier have demonstrated relatively good performance, and may also be optimal for HEL modulation in multi-kW class systems to encode each beam for ease of non-target-in-the-loop incoherent beam applications. Generally speaking, the PRBS pattern may be selected to have a length above a first threshold for avoiding an occurrence of backward propagation being in phase with forward propagation when the pattern repeats, and having a length below a second threshold for phase mismatch in the fiber amplifier 60.

The phase modulator 40 may be an optical modulator configured to control the optical phase of a laser beam received from the polarizer 30 based on the PRBS pattern provided by the PRBS pattern generator 50. As such, the phase modulator 40 may include an input device 70 configured to receive the polarization filtered output of the polarizer 30 and a modulator 72 configured to modulate the polarization filtered output of the polarizer 30 based on the PBRS pattern. The phase modulator 40 may be an electro-optic modulator, a liquid crystal modulator, or any other suitable type of optical modulator. Furthermore, the phase modulator 40 may be a resonant or wideband type device with modulation bandwidth and/or optical bandwidth characteristics selected appropriately for the desirable performance characteristics of the laser device 10. An output of the phase modulator 40 may be amplified by the fiber amplifier 60.

Figure 2:
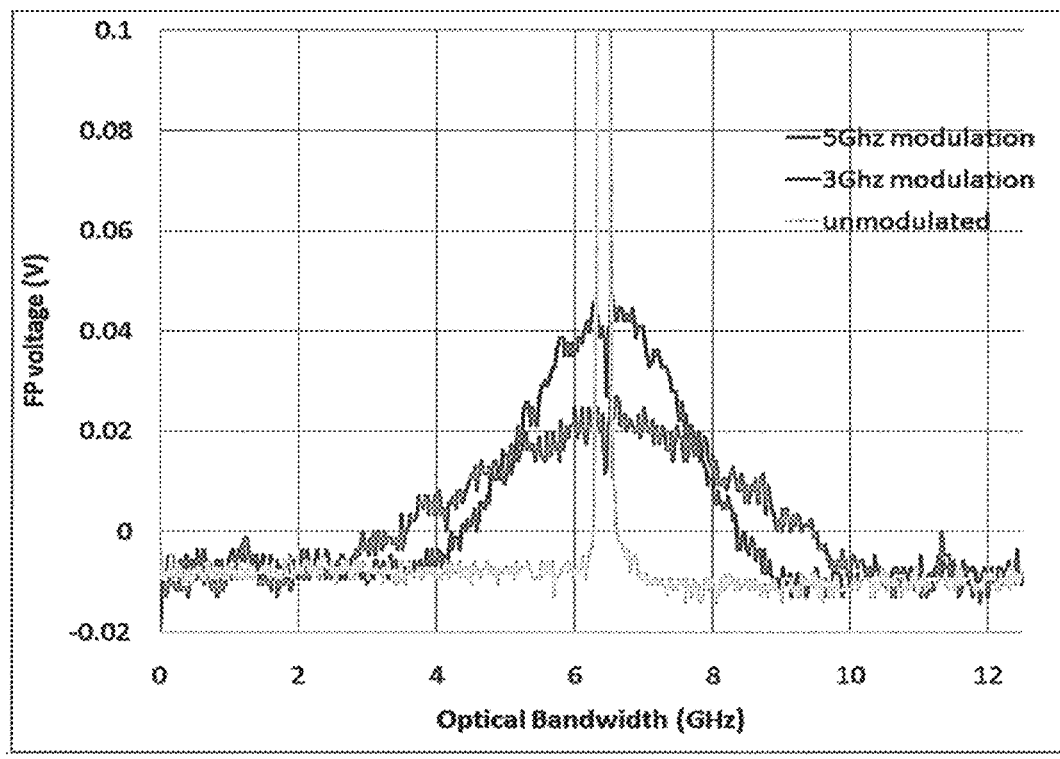
FIG. 2 illustrates a graph of the optical bandwidth of modulated and unmodulated singe frequency seed laser input using the bit pattern of $2^7$ according to an example embodiment.

FIG. 2 illustrates a graph of the optical bandwidth of modulated and unmodulated singe frequency seed laser input using the bit pattern of $2^7$. As such, FIG. 2 illustrates the modulated and unmodulated linewidth of a 1 kW seed laser when the bit pattern of $2^7$ is employed. The trough that is evident in the location of the unmodulated laser line center demonstrates full modulation of the laser diode. Without polarization filtering (e.g., using the polarizer 30), the trough does not exist and may actually be a peak (called a carrier or DC term) in some cases. As such, the trough at the carrier frequency for modulated cases illustrates good modulation of the transmitted signal. Generally speaking, linewidth broadens with increased modulation frequency.

Figure 3:
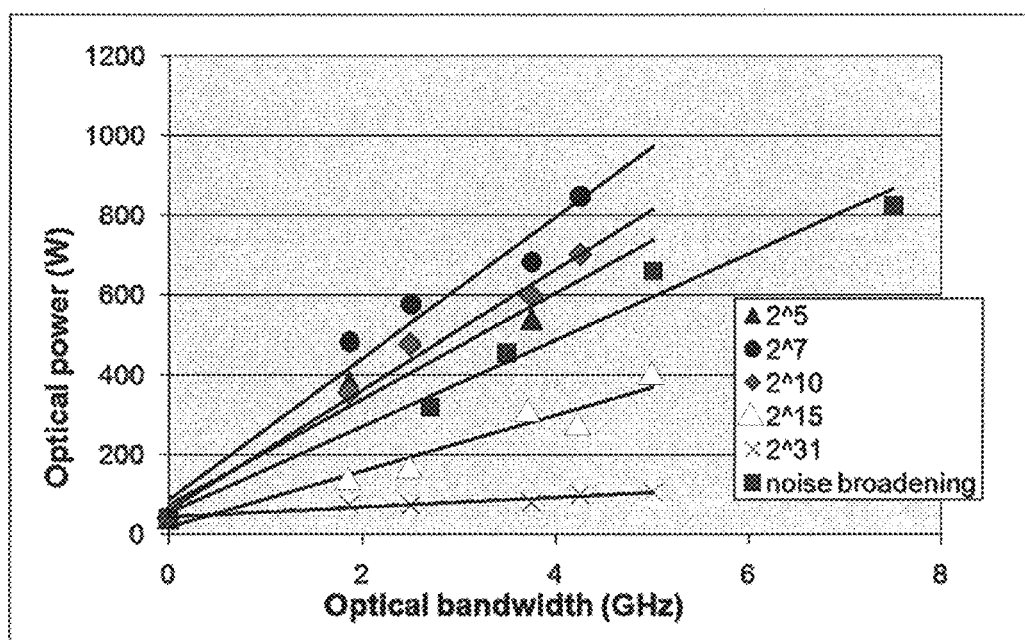
FIG. 3 illustrates a graph of measured output power as a function of optical line bandwidth according to an example embodiment.

FIG. 3 illustrates a graph of measured output power as a function of optical line bandwidth. By employing the polarizer 30 (e.g., in the form of a fiber linear polarizer) and noise broadening, one example embodiment was enabled to achieve 600 W with a 5 GHz optical bandwidth (as shown by the square data points on FIG. 3). However, if noise broadening is replaced with the PRBS modulation scheme, performance results may change. FIG. 3 illustrates several options involving longer bit sequences (e.g., 15 and 31 bits) resulting in lower power delivery than the noise broadened embodiment. However, as shown in FIG. 3 by the data set with circular data points corresponding to the bit pattern of $2^7$, 1 kW may be achievable at a 5 GHz optical bandwidth. Various other bit sequence lengths (e.g., 5 bit and 10 bit) also outperform the noise broadened embodiment, but do not achieve the same performance as the 7 bit example. Accordingly, some example embodiments may be enabled to achieve as much as a two-fold increase over the power deliverable by an embodiment modulating with noise. However, for example, the 5 bit pattern length may be considered to be a length above the first threshold for avoiding an occurrence of backward propagation being in phase with forward propagation when the pattern repeats, and the 10 bit pattern length may be considered to be a length below the second threshold for phase mismatch in the fiber amplifier 60. By employing a PRBS modulation scheme of an example embodiment that is selected within the first and second threshold lengths, a linewidth advantage of about 1.6 to about 2 times the linewidth achievable via other modulation schemes may be achievable without having to reduce output power.

Figure 4:
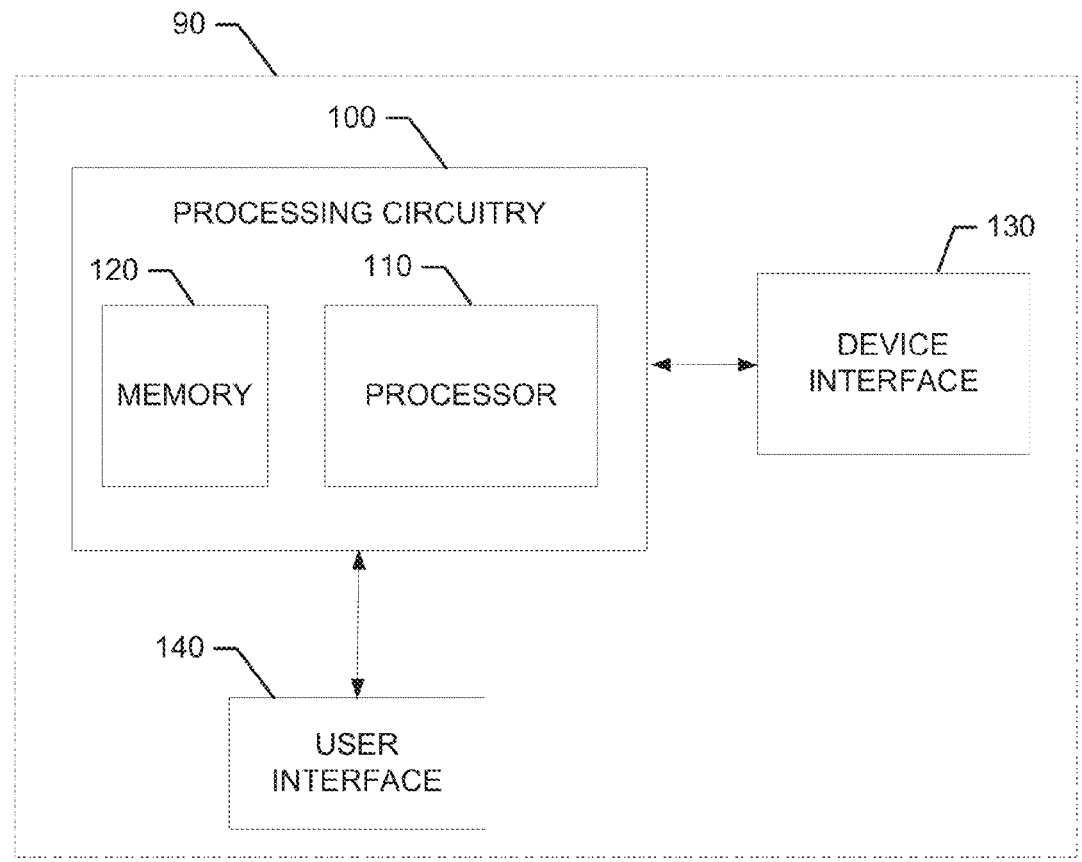
FIG. 4 illustrates a block diagram of one instance of the laser controller according to an example embodiment.

In some embodiments, the laser device 10 (or at least some components thereof) may operate under computer control, or at least under the control of some form of control element (e.g., laser controller 90) that may provide control signals for operation of the PRBS pattern generator 50, the phase modulator 40 and/or the seed laser 20. In an example embodiment, the laser controller 90 may be a computer controlled device, and in some embodiments may be programmable to define patterns (e.g., PRBSs) that may be desirable for implementation in modulation schemes. FIG. 4 illustrates a block diagram of one instance of the laser controller 90 according to an example embodiment.

As shown in FIG. 4, the laser controller 90 may include may include or otherwise be in communication with processing circuitry 100 that is configurable to perform actions in accordance with example embodiments described herein. As such, for example, the functions attributable to the laser controller 90 may be carried out by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard).

In an example embodiment, the processing circuitry 100 may include one or more instances of a processor 110 and memory 120 that may be in communication with or otherwise control a device interface 130 and, in some cases, a user interface 140. As such, the processing circuitry 100 may be embodied as a circuit chip (e.g., an integrated circuit chip) configured (e.g., with hardware, software or a combination of hardware and software) to perform operations described herein.

The user interface 140 (if implemented) may be in communication with the processing circuitry 100 to receive an indication of a user input at the user interface 140 and/or to provide an audible, visual, mechanical or other output to the user. As such, the user interface 140 may include, for example, a display, one or more buttons or keys (e.g., function buttons), and/or other input/output mechanisms (e.g., keyboard, microphone, speakers, cursor, joystick, lights and/or the like).

The device interface 130 may include one or more interface mechanisms for enabling communication with other devices. In some cases, the device interface 130 may be any means such as a device or circuitry embodied in either hardware, or a combination of hardware and software that is configured to receive and/or transmit data from/to devices in communication with the processing circuitry 100.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the laser controller 90 to carry out various functions in accordance with example embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets indicative of patterns and/or encoding schemes to be employed. Among the contents of the memory 120, applications may be stored for execution by the processor 110 in order to carry out the functionality associated with each respective application. In some cases, the applications may include directions for control of the laser device 10 and/or the components thereof to achieve desirable PRBS patterns and/or modulation schemes that are desired for various laser device 10 operations.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to example embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the laser controller 90. As such, in some embodiments, the processor 110 (or the processing circuitry 100) may be said to cause each of the operations described in connection with the laser controller 90 by directing the laser controller 90 to undertake the corresponding functionalities responsive to execution of instructions or algorithms configuring the processor 110 (or processing circuitry 100) accordingly. For example, the processor 110 may define programmable operating frequencies and/or PRBS patterns for modulation of the output of the laser device 10 to produce a high power, fiber laser having desirable characteristics responsive to execution of instructions stored in the memory 120.

Accordingly, some example embodiments may provide a way to narrow the linewidth of a high energy fiber laser by a factor of about 1.6 to about 2 without reducing output power. As power is scaled, required optical bandwidth to achieve corresponding powers may also be scaled using conventional techniques. However, some example embodiments may be used to scale fiber laser output power to higher powers. Wider bandwidth also typically makes it more difficult to perform coherent beam combining, which may be required or desired for application to kW-class high energy fiber lasers. However, some example embodiments may enable such wider bandwidths to be achieved while still enabling coherent beam combining for high power applications. The length of pattern used in association with some example embodiments, and the pattern itself, may be optimized for a given amplifier in order to mitigate SBS gain.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A laser device comprising:
    a seed laser;
    a polarizer optically coupled to receive an output of the seed laser and generate a polarization filtered output;
    a pseudorandom bit sequence (PRBS) pattern generator configured to generate a PRBS pattern; and
    a phase modulator configured to apply a PRBS modulation scheme to the polarization filtered output based on the PRBS pattern,
    wherein the PRBS pattern is generated to have a length above a first threshold for avoiding an occurrence of backward propagation being in phase with forward propagation in an active fiber receiving an output of the phase modulator when the pattern repeats and below a second threshold for phase mismatch in the active fiber.

2. The laser device of claim 1, wherein the polarizer comprises a linear fiber polarizer.

3. The laser device of claim 1, wherein the first threshold is five bits and wherein the second threshold is ten bits.

4. The laser device of claim 1, wherein the PRBS pattern is a PRBS including seven bits.

5. The laser device of claim 1, further comprising a power amplifier configured to amplify an output of the PRBS pattern generator prior to provision of the PRBS pattern to the phase modulator.

6. The laser device of claim 1, further comprising a fiber amplifier configured to amplify an output of the phase modulator to generate a power level of at least about 1 kW.

7. The laser device of claim 6, wherein the second threshold is determined relative to causing phase mismatch in the active fiber of the fiber amplifier.

8. The laser device of claim 1, wherein the seed laser comprises a seed diode having a linewidth of about 30 MHz.

9. The laser device of claim 1, further comprising a laser controller configured to control operation of the laser device.

10. The laser device of claim 8, wherein the laser controller includes processing circuitry configured to control a modulation scheme employed by the laser device.

11. The laser device of claim 8, wherein the laser controller includes processing circuitry configured to control a single frequency seed source employed by the seed laser.

12. A phase modulator for a laser device, the phase modulator comprising:
    an input device in operable communication with a polarizer to receive a polarization filtered output of the polarizer responsive to the polarizer polarizing an output of a seed laser; and
    a modulator configured to modulate the polarization filtered output of the polarizer based on a pseudorandom bit sequence (PRBS) pattern provided by a PRBS generator in communication with the phase modulator,
    wherein the PRBS pattern is generated to have a length above a first threshold for avoiding an occurrence of backward propagation being in phase with forward propagation in an active fiber receiving an output of the phase modulator when the pattern repeats and below a second threshold for phase mismatch in the active fiber.

13. The phase modulator of claim 12, wherein the first threshold is five bits and wherein the second threshold is ten bits.

14. The phase modulator of claim 12, wherein the PRBS pattern is a PRBS including seven bits.

15. The phase modulator of claim 12, wherein the PRBS pattern is provided from the PRBS generator via a power amplifier configured to amplify an output of the PRBS pattern generator prior to provision of the PRBS pattern to the phase modulator.

16. The phase modulator of claim 12, wherein an output of the phase modulator is provided to a fiber amplifier configured to amplify an output of the phase modulator to generate a power level of at least about 1 kW.

17. The phase modulator of claim 12, wherein the phase modulator operates at least partially under control of a laser controller.

18. The phase modulator of claim 17, wherein the laser controller includes processing circuitry configured to control a modulation scheme employed by the laser device.

* * * * *